United States Patent
Leon Guerrero et al.

(10) Patent No.: US 10,406,951 B2
(45) Date of Patent: Sep. 10, 2019

(54) SEATING ASSEMBLY WITH LINER

(71) Applicant: Ford Global Technologies, LLC, Dearborn, MI (US)

(72) Inventors: Miguel Angel Leon Guerrero, Villas de Aragon (MX); Genaro Hernan Ramirez Escalante, Mexico City (MX); Christopher Diaz Rodriguez, Mexico City (MX); Nicole Pamela Herrera Gutierrez, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 78 days.

(21) Appl. No.: 15/727,759

(22) Filed: Oct. 9, 2017

(65) Prior Publication Data

US 2019/0106034 A1   Apr. 11, 2019

(51) Int. Cl.
*B60N 2/36* (2006.01)
*B60N 2/60* (2006.01)
*B60N 2/30* (2006.01)
*B60R 13/01* (2006.01)

(52) U.S. Cl.
CPC ......... *B60N 2/6009* (2013.01); *B60N 2/3045* (2013.01); *B60N 2/36* (2013.01); *B60N 2/6018* (2013.01); *B60R 13/013* (2013.01); *B60R 2013/016* (2013.01)

(58) Field of Classification Search
CPC ...... B60N 2/6009; B60N 2/3045; B60N 2/36; B60N 2/6018; B60R 13/013
USPC ......... 297/228.1–229, 108–110, 119; 296/63
See application file for complete search history.

(56) References Cited

U.S. PATENT DOCUMENTS

| | | | | |
|---|---|---|---|---|
| 1,287,394 | A * | 12/1918 | Moomaw | B60N 2/3095 296/63 |
| 2,698,648 | A * | 1/1955 | Kronheim | A47C 7/347 297/110 |
| 4,396,227 | A | 8/1983 | Neilson | |
| 5,029,350 | A * | 7/1991 | Edelson | A47C 3/16 297/183.1 |
| 5,702,143 | A * | 12/1997 | Shimazaki | B60R 21/06 160/24 |
| 5,707,107 | A | 1/1998 | Melone | |
| 5,709,431 | A | 1/1998 | Horn | |
| 6,250,704 | B1 | 6/2001 | Garrido | |
| 6,371,558 | B1 | 4/2002 | Couasnon | |
| 6,655,736 | B1 | 12/2003 | Arenas | |
| 6,877,807 | B2 | 4/2005 | Mizuno et al. | |
| 7,261,375 | B2 * | 8/2007 | Godshaw | A01K 1/0272 119/28.5 |

(Continued)

OTHER PUBLICATIONS

"Best Inflatable Air Bed for Kids, Adults and Pets," Popular Pet Car Seat Covers for Your Vehicle Back Seat, www.bestinflatableairbed. com/dog-covers-for-car.html, Apr. 6, 2017, pp. 1-7.

*Primary Examiner* — Syed A Islam
(74) *Attorney, Agent, or Firm* — Vichit Chea; Price Heneveld LLP

(57) ABSTRACT

A vehicle seating assembly includes a seat coupled to a seatback. The seat includes a cushion divided into a first part and a second part. The first part and the second part are arranged to form a platform in an opened state. A liner is stored between the first part and the second part in the unopened state. The liner covers the platform in the opened state.

20 Claims, 8 Drawing Sheets

(56) References Cited

U.S. PATENT DOCUMENTS

| | | | |
|---|---|---|---|
| 7,434,876 B2 | 10/2008 | Smulders et al. | |
| 7,490,896 B2 | 2/2009 | Smith | |
| 7,628,438 B2 * | 12/2009 | Partch | B60N 2/305 |
| | | | 296/24.46 |
| 7,677,662 B2 | 3/2010 | Thompson | |
| 9,610,877 B2 | 4/2017 | Umlauf | |
| 2016/0176315 A1 * | 6/2016 | Moore | B60N 2/0292 |
| | | | 297/108 |
| 2016/0325660 A1 | 11/2016 | Umlauf | |

* cited by examiner

US 10,406,951 B2

SEATING ASSEMBLY WITH LINER

FIELD OF THE DISCLOSURE

The present disclosure generally relates to a cover for an interior of a vehicle and, more specifically, a protective cover for vehicle seating areas.

BACKGROUND OF THE DISCLOSURE

Protective covers in vehicles have become increasingly important as users utilize vehicles to transport various items. It is desirable for a vehicle to include storage areas for protective covers that allow selective deployment of the covers for changing vehicle needs. Further, it is desirable to provide protective covers to keep vehicle surfaces clean during transportation of dirty cargo.

SUMMARY OF THE DISCLOSURE

According to one aspect of the present disclosure, a vehicle seating assembly includes a seat coupled to a seatback. The seat includes a cushion divided into a first part and a second part. The first part and the second part are arranged to form a platform in an opened state. The vehicle seating assembly also includes a liner. The liner is stored between the first and the second parts in an unopened state, and the liner covers the platform in the opened state.

Embodiments of the first aspect of the disclosure can include any one or a combination of the following features:
- a pivotable coupling that defines an axis wherein the first part and the second part are vertically aligned, a first edge of the first part and a first edge of the second part are attached to the pivotable coupling, and the first part is rotatable about the pivotable coupling so that the first part and the second part are horizontally aligned;
- the first part pivots approximately 180 degrees about the axis;
- the first part and the second part are vertically aligned in the unopened state, and wherein the first part and the second part are horizontally aligned in the opened state;
- the liner includes an extendable member that selectively extends over the seatback;
- the seatback comprises a seating surface and wherein the liner is selectively arranged over the seating surface at least when the seat is in the opened state;
- an adjacent seatback positioned forward of the seat wherein the platform is disposed between the seatback and the adjacent seatback;
- the adjacent seatback includes a back surface and the liner includes a forward extending portion that is selectively arranged proximate the back surface;
- the liner includes a plurality of fasteners that secure the liner to the seatback and the adjacent seatback;
- the fasteners are loops that hang on a headrest of the seatback and a headrest of the adjacent seatback; and/or
- the liner is removably attached to the platform.

According to another aspect of the present disclosure, a seating assembly includes a seat wherein the seat includes an upper portion and a lower portion. A first edge of the upper portion and a first edge of the lower portion are coupled at a pivot and are operable between a seating position and a platform position wherein the upper portion is rotated about the pivot so that the lower portion and the upper portion are arranged adjacent to one another to form a substantially flat surface in the platform position.

Embodiments of the second aspect of the disclosure can include any one or a combination of the following features:
- a cover that is stored between the upper and lower portions of the seat in the seating position and wherein the cover includes a first portion and a second portion wherein the first portion overlays a top surface of the upper portion in the platform position and the second portion overlays a top surface of the lower portion in the platform position;
- a seatback wherein the seatback is coupled to the lower portion of the seat and wherein the cover includes an extendable third portion that overlays the seatback;
- an adjacent seatback wherein the cover includes an extendable fourth portion that overlays the adjacent seatback;
- the cover includes an extendable fifth portion that overlays an adjacent structure; and/or
- the cover includes an extendable sixth portion that overlays an adjacent structure.

According to yet another aspect of the present disclosure, a seating assembly includes a seat wherein the seat has a plurality of panels. The plurality of panels are selectively arrangeable in a folded position or an unfolded position. A cover is stowed between the panels in the folded position. The cover is selectively arrangeable to form a top surface of the plurality of panels in the unfolded position.

Embodiments of the third aspect of the disclosure can include any one or a combination of the following features:
- a seatback wherein the seatback is coupled to the seat and an adjacent seatback wherein the cover is selectively arrangeable over the seatback and the adjacent seatback; and/or
- an outboard member wherein the cover is selectively arrangeable over the outboard member.

These and other aspects, objects, and features of the present disclosure will be understood and appreciated by those skilled in the art upon studying the following specification, claims, and appended drawings.

DETAILED DESCRIPTION

Figure 1:
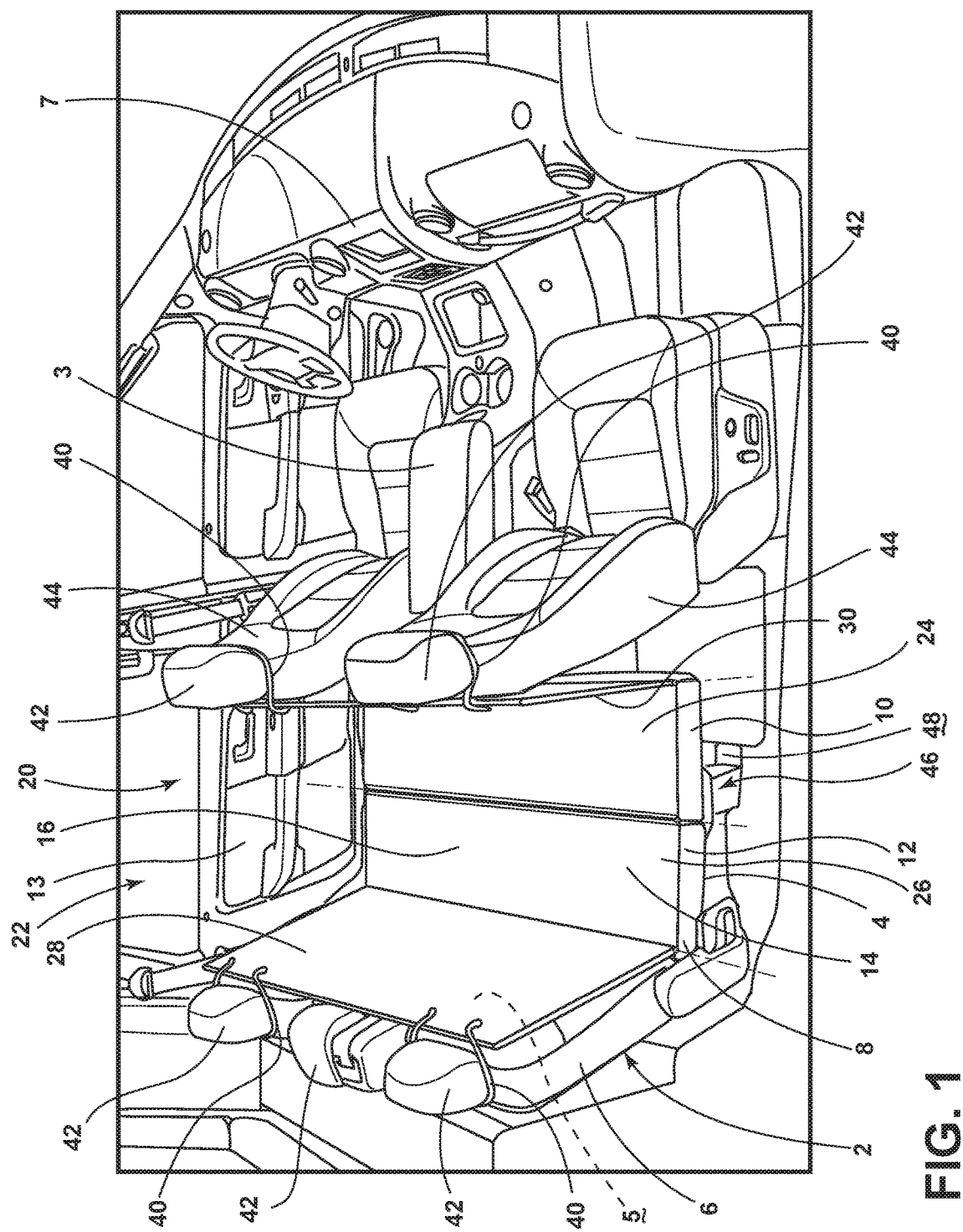
FIG. 1 is a perspective view of a vehicle interior including a seat platform in an opened state and a liner in an extended state wherein the platform is positioned between a seatback and an adjacent seatback of an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

Referring to FIGS. 1-8, a vehicle seating assembly 2 includes a seat 4 coupled to a seatback 6. The seat 4 includes a cushion 8 divided into a first part 10 and a second part 12. The first part 10 and the second part 12 are arranged to form a platform 14 in an opened state. The vehicle seating assembly 2 also includes a liner 16. The liner 16 is stored between the first part 10 and the second part 12 in the unopened state. The liner 16 covers the platform 14 in the opened state. The first part 10 of the cushion 8 may be referred to as the upper portion of the seat 4. The second part 12 of the cushion 8 may be referred to as the lower portion of the seat 4.

Referring to FIG. 1, the liner 16 is illustrated inside a cabin 20 of a vehicle 22. The seat 4 is in the opened state. The liner 16 is on top of the platform 14. The liner 16 may also be referred to as a cover or a protective cover. The liner 16 includes a first portion 24, a second portion 26, a third portion 28, and a fourth portion 30. The first portion 24 overlays the first part 10 of the cushion 8. The second portion 26 overlays the second part 12 of the cushion 8. The third portion 28 overlays the seatback 6 surface 5. The fourth portion 30 is proximate the adjacent seatbacks 44. The adjacent seatbacks 44 are the front row passenger's seatback and the front row driver's seatback in the depicted aspect. Fasteners, which are loops 40 in the depicted aspect, hook around the headrests 42 of the seatback 6 and the adjacent seatbacks 44 to retain the liner third portion 28 and the liner fourth portion 30 to the seatback 6 and the adjacent seatbacks 44, respectively.

Referring to FIG. 1, in the depicted aspect, the seating assembly 2 is a bench seat located in the last row of a vehicle 22. The seating assembly 2 is typically supported on a seat mounting assembly 46. The seat mounting assembly 46 may be configured to allow the seating assembly 2 to be adjusted in forward and rearward directions relative to the longitudinal axis of the vehicle 22. In the depicted aspect, the seat mounting assembly 46 couples the seating assembly 2 with the floor 48. In various aspects, the seating assembly 2 may not include a seat mounting assembly 46 and alternatively may be fixedly coupled with the floor 48 or other structure, for example a wall, of the vehicle 22. In various aspects of the disclosure, liner 16 may be constructed to cover vehicle 22, console 3, instrument panel 7, and rear driver side door 13.

In certain conditions, when drivers wish to transport animals or dirty items (landscaping tools, construction supplies, athletic equipment), drivers may use the liner 16 to create a protected space within a vehicle. For example, pet owners may wish to use the liner 16 to provide a covered surface for transporting pets. Landscapers, construction workers, and athletes may also use the liner 16 while transporting dirty equipment or sports gear. The liner 16 is selectively retrievable from within the cushion 8 when it is needed. Cushion 8 may be opened to create platform 14, and liner 16 may be arranged to cover the platform 14, the seatback 6, and the adjacent seatbacks 44. In various aspects, the liner 16 may be detached from the platform 14 and cleaned. After the liner 16 is cleaned, it may be reattached to the platform 14. The liner 16 may be fastened to the platform 14 with various mechanisms such as hook-and-loop attachments, zippers, buttons, elastic cords fixed about grommets, straps and buckles, and/or other securing means.

Figure 2:
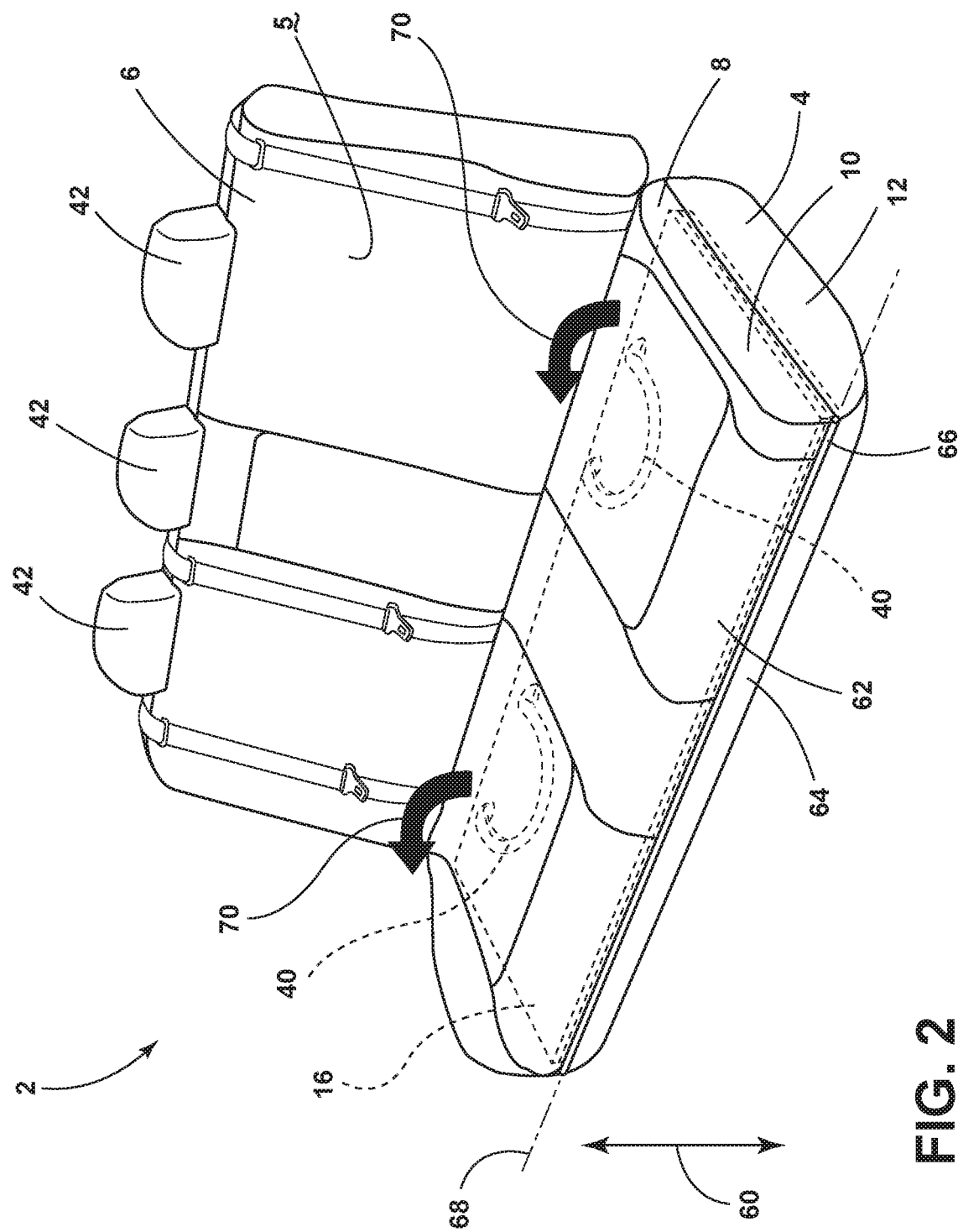
FIG. 2 is a perspective view of a seating assembly including a seat in the unopened state of an aspect of the present disclosure.

Referring to FIG. 2, the cushion 8 is shown in the unopened state. The first part 10 and the second part 12 of the cushion 8 are vertically aligned in the direction depicted by arrow 60 in the unopened state. The first edge 62 of the first part 10 and the first edge 64 of the second part 12 are attached to a pivotable coupling. In the depicted aspect, the pivotable coupling is the hinge 66. The first part 10 is configured to pivot about the axis 68 of the hinge 66 between the unopened state depicted in FIG. 2 and the opened state depicted in FIG. 3. In various aspects, the first part 10 pivots approximately 180 degrees about the axis 68 of the hinge 66. Arrows 70 in FIG. 2 show the direction of the rotation of the first part 10 about the hinge 66 from the unopened position in FIG. 2 to the opened position in FIG. 3. Cushion 8 is shown in the unopened position in FIG. 2. Cushion 8 is shown in the opened position in FIGS. 1, 3-8.

Figure 3:
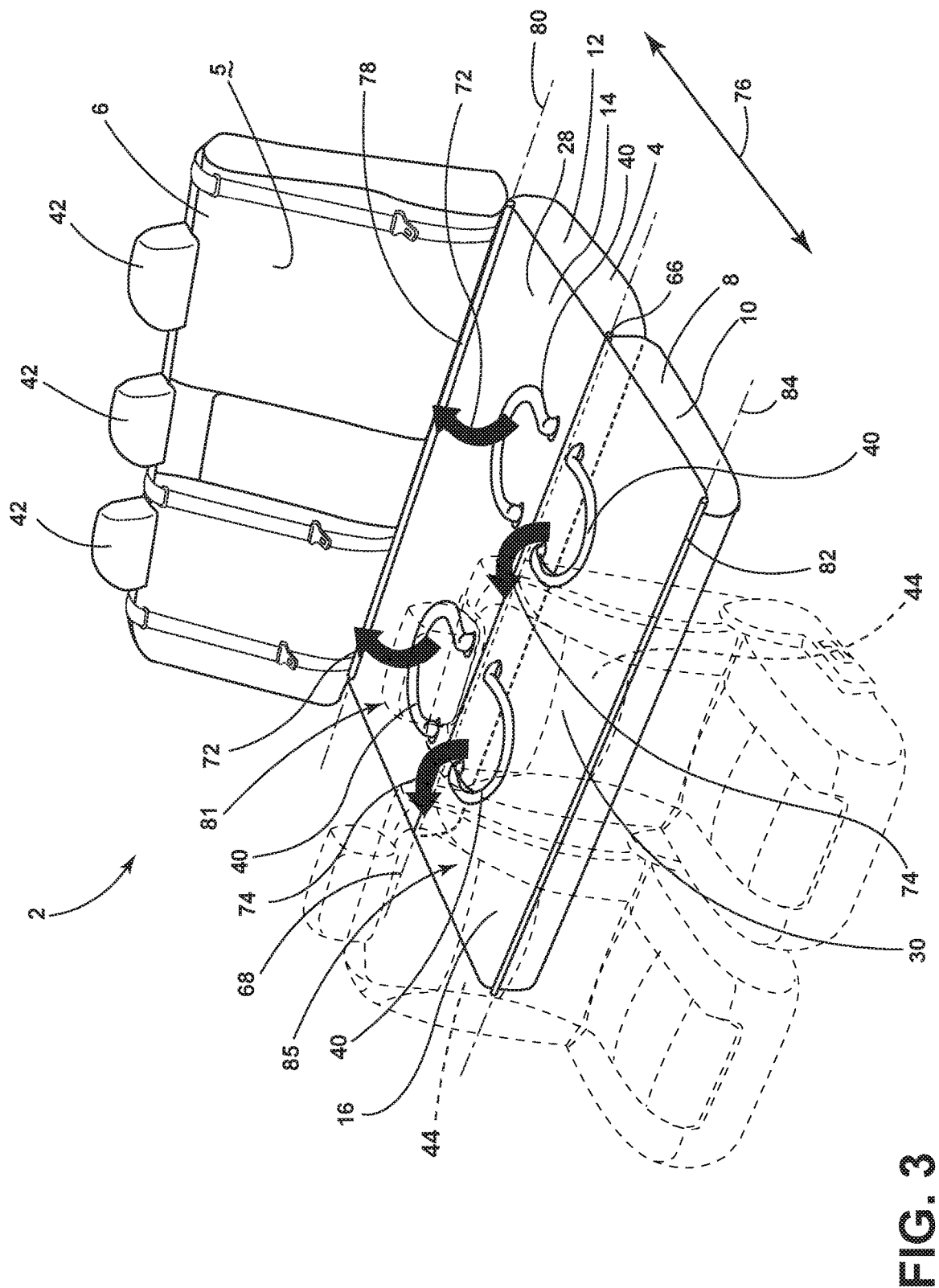
FIG. 3 is a perspective view of a seating assembly including a seat platform in the opened state and the liner covering the platform of an aspect of the present disclosure.
Figure 4:
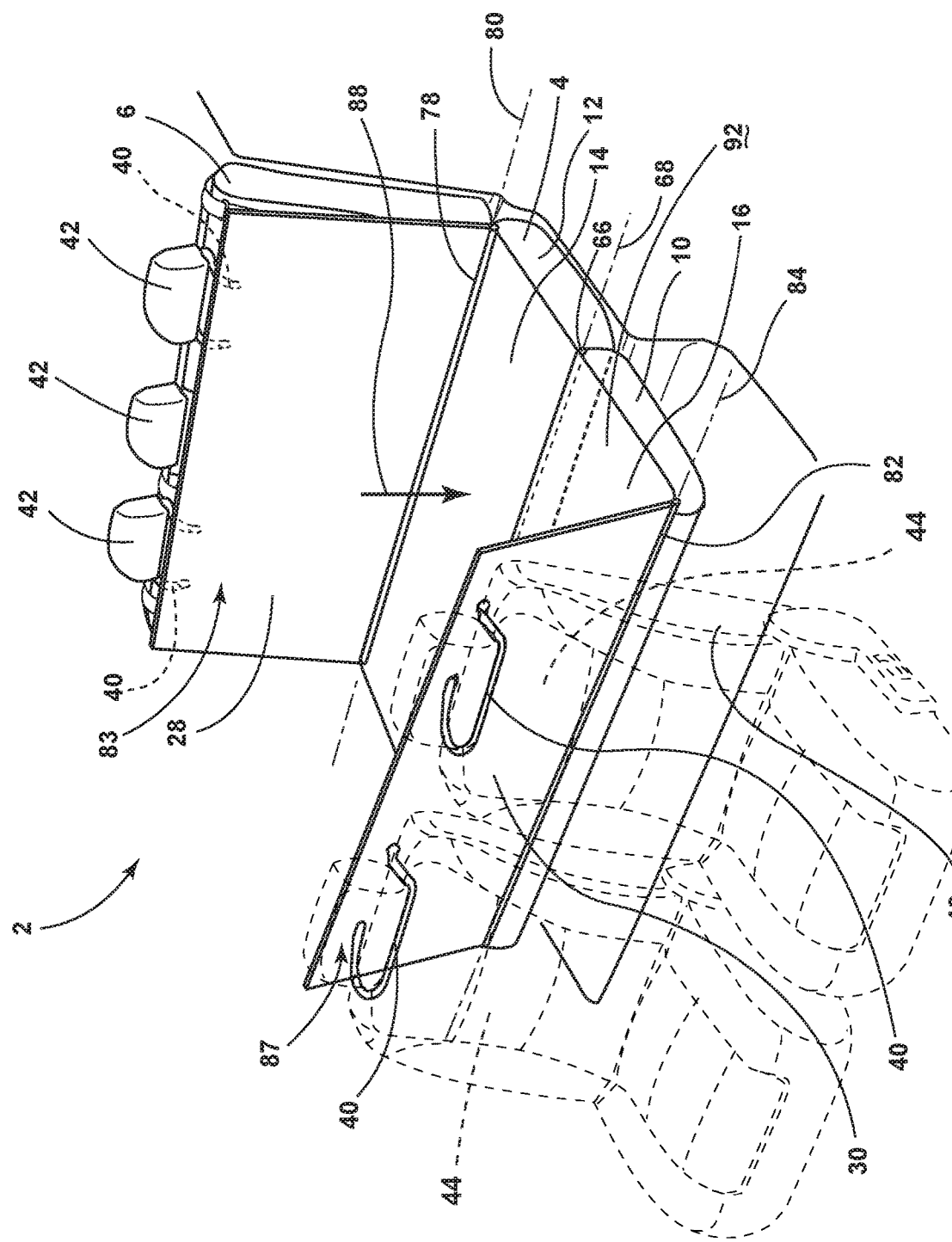
FIG. 4 is a perspective view of a seating assembly including a seat platform in the opened state and the liner in the extended state of an aspect of the present disclosure.

With reference to FIG. 3, the liner 16 includes the third portion 28 and the fourth portion 30. The third portion 28 is selectively extendable over the seatback 6 surface 5. The arrows 72 depict the direction in which the third portion 28 is moved. The fourth portion 30 is selectively extendable over the adjacent seatback 44. The arrows 74 depict the direction in which the fourth portion 30 is moved. The first part 10 and the second part 12 of the cushion 8 are horizontally aligned in the direction depicted by arrow 76. The first part 10 and the second part 12 are vertically aligned in FIG. 2. The first part 10 and the second part 12 are horizontally aligned in FIGS. 1, 3-8. With reference to FIGS. 3-4, in the depicted aspect, the liner third portion 28 is rotatable about a rearward pivotable coupling that defines an axis 80 and that is depicted as hinge 78 from a substantially horizontal position 81 to a substantially vertical position 83. In the depicted aspect, the liner fourth portion 30 is rotatable about a forward pivotable coupling that defines an axis 84 and that is depicted as hinge 82 from a substantially horizontal position 85 to a substantially vertical position 87. In various aspects of the disclosure, the liner 16 may be removably attached to the platform 14 proximate the hinge 78, the hinge 82, and the hinge 66.

Figure 5:
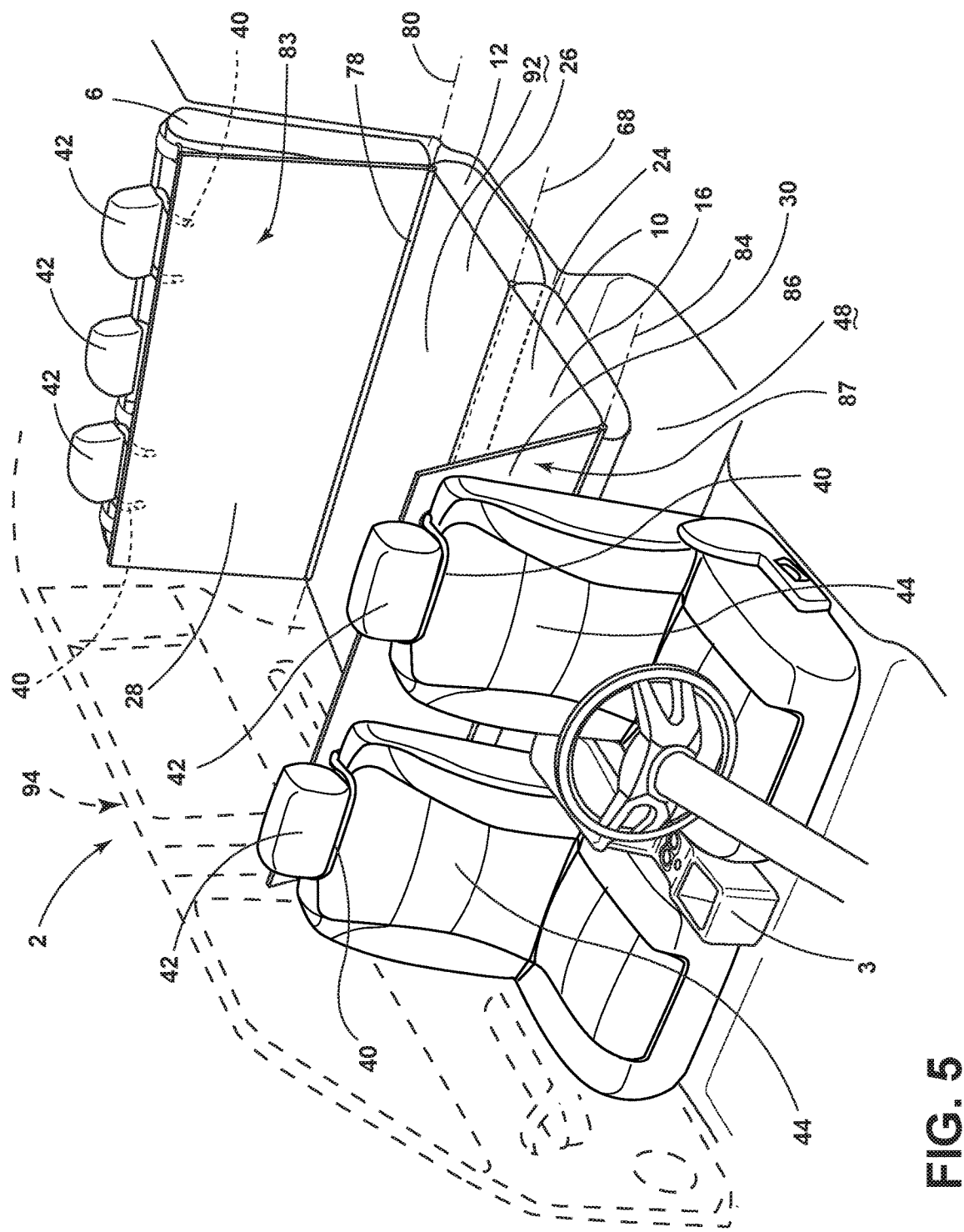
FIG. 5 is a perspective view of a seating assembly including a seat platform in the opened state and the liner in the extended state wherein the platform is positioned between a seatback and an adjacent seatback of an aspect of the present disclosure.

Referring to FIGS. 4-5, the extendable portions (liner third portion 28 and liner fourth portion 30) of the liner 16 are shown in the extended or opened positions. In various aspects, the liner 16 may include a plurality of fasteners that secure the liner 16 to the seatback 6 and/or the adjacent seatbacks 44. In various aspects, loops 40 hang on the headrests 42 of the seatback 6 and the adjacent seatbacks 44.

In various aspects of the disclosure, supports may be located between the second part 12 of cushion 8 and the floor 48. In various aspects, the supports may help the platform 14 hold loads as shown by arrow 88 that are applied to the platform 14 when it is loaded.

Figure 6:
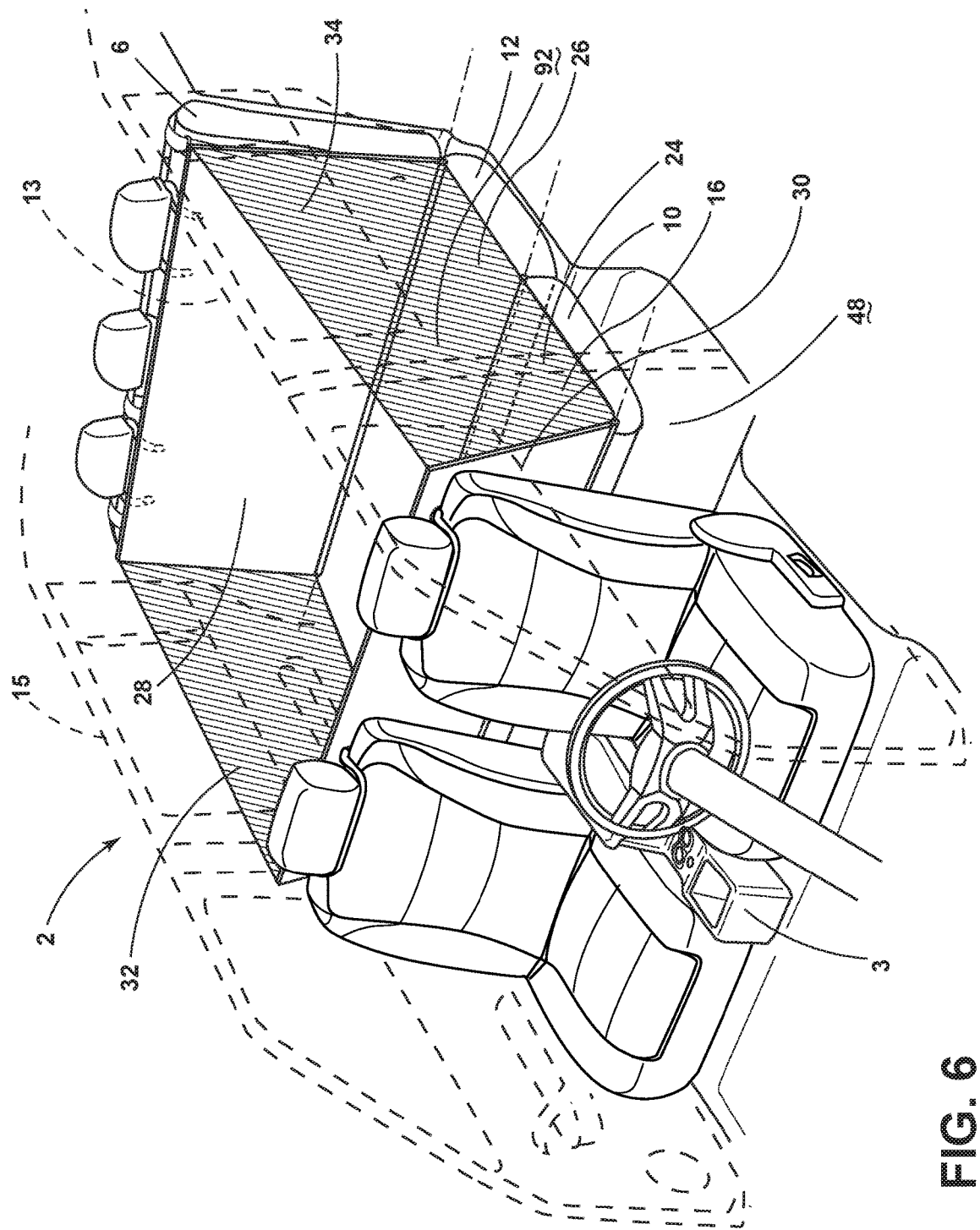
FIG. 6 is a perspective view of a seating assembly including a seat platform in the opened state and the liner in the extended state with an extendable fifth portion and an extendable sixth portion covering doors of an aspect of the present disclosure.

Referring to FIG. 6, the liner 16 includes a fifth portion 32 that is extendable over the rear passenger side door 15. The liner 16 includes a sixth portion 34 that is extendable over the rear driver side door 13. The fifth portion 32 and the sixth portion 34 provide additional protection of the vehicle interior by covering the rear passenger side door 15 and the rear driver side door 13, respectively. The fifth portion 32 may be extendable from various positions, including but not limited to, a headliner over the rear passenger side door 15, the rear passenger side door 15, the floor 48, or a portion of the seating assembly 2. The sixth portion 34 may be extendable from various positions, including but not limited to, a headliner over the rear driver side door 13, the rear driver side door 13, the floor 48, or a portion of the seating assembly 2.

Figure 7:
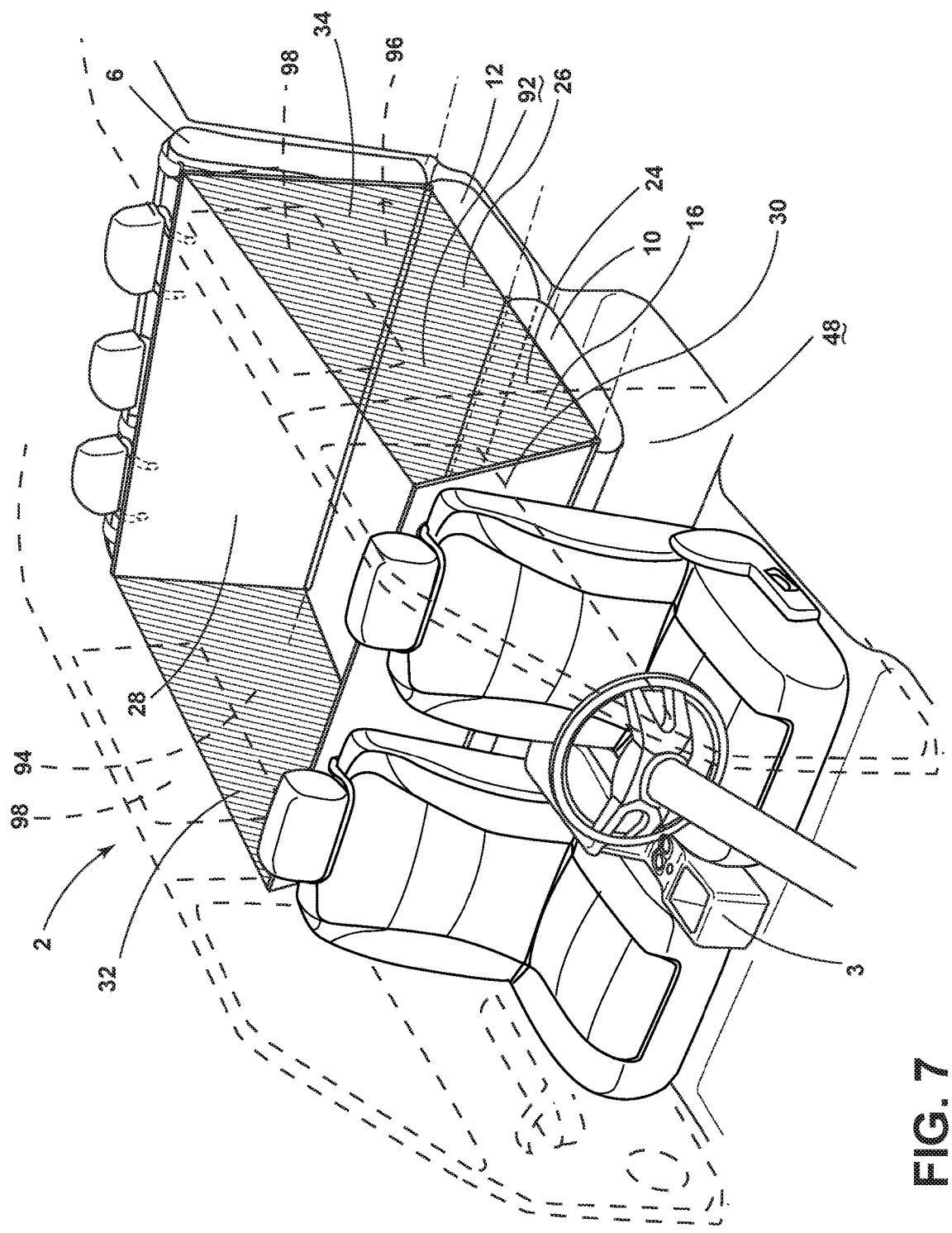
FIG. 7 is a perspective view of a seating assembly including a seat platform in the opened state and the liner in the extended state with an extendable fifth portion and an extendable sixth portion covering vehicle outboard members of an aspect of the present disclosure.

Referring to FIG. 7, the liner 16 includes a fifth portion 32 that is extendable over a passenger side outboard member. In the depicted aspect, the passenger side outboard member is a vehicle wall 94 with a window 98. The liner 16 includes a sixth portion 34 that is extendable over a driver side outboard member. In the depicted aspect, the driver side outboard member is a vehicle wall 96 with a window 98. In various aspects of the disclosure, the liner 16 may extend over an adjacent structure that may include one or more of a rear driver side door 13, a rear passenger side door 15, a passenger side vehicle wall 94 with window 98, a driver side vehicle wall 96 with window 98, a console 3, an instrument panel 7, or any other vehicle structure.

Figure 8:
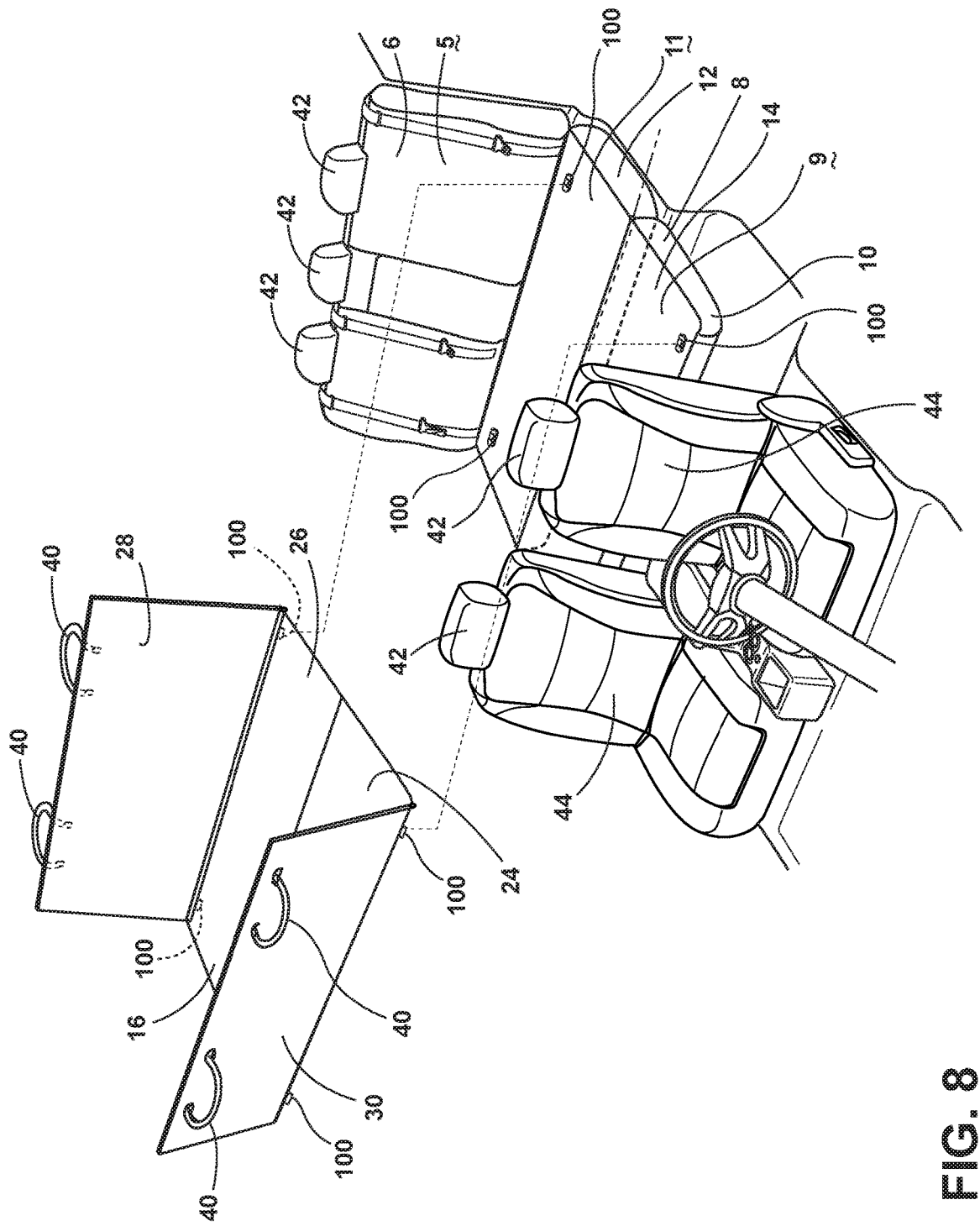
FIG. 8 is a perspective view of a seating assembly including a seat platform in the opened state and the liner in the extended state wherein the platform is positioned between a seatback and an adjacent seatback and wherein the liner is detached of an aspect of the present disclosure.

Referring to FIG. 8, the liner 16 is shown removed from the platform 14, the seatback 6, and the adjacent seatback 44. Attachments in the form of snap fittings 100 are on the liner 16, top surface 9 of the first part 10 of cushion 8, and top surface 11 of the second part 12 of cushion 8.

In various aspects of the disclosure, the seat may comprise a plurality of panels (cushion first part 10, cushion second part 12). The plurality of panels may be selectively arrangeable in a folded position or an unfolded position. The folded position is shown in FIG. 2. The unfolded position is shown in FIGS. 1, 3-8. A cover (liner 16) may be stowed between the panels in the folded position. The cover is selectively arrangeable to form the top surface 92 of the plurality of panels in the unfolded position. In various aspects of the disclosure, the cover may also be arranged over an outboard member. An outboard member includes any outer portion of the vehicle which typically comprises panels, doors, pillars, and the like. In the depicted aspect of FIG. 7, the vehicle 22 includes the passenger side outboard member (vehicle wall 94 with window 98) and the driver side outboard member (vehicle wall 96 with window 98).

In various aspects of the disclosure, the seating assembly 2 may be a seat for a passenger, a front bucket seat, a rear bucket seat, a rear row of seats, a rear bench seat, or any other vehicle seat. In various aspects of the disclosure, the liner may be utilized with only a seat (without a seatback). In various aspects of the disclosure, the seating assembly may be oriented in sideways, rearward-facing, or other orientations within the vehicle 22.

In various aspects of the disclosure, the liner 16 and variations thereof may be used in mass transit, fleet, and other larger occupant vehicles. Mass transit vehicles may include, but are not limited to, ground, air, and aquatic mass transit vehicles such as city buses, trolley busses, trams (or light rail), passenger trains, rapid transit (metro/subway/underground), ferries, airplanes, helicopters, autonomous vehicles, including autonomous buses, and electrical vehicles. In various aspects, the liner may be made of waterproof and/or anti-scratch material.

In various aspects of the disclosure, the liner is made to carry large hard-work tools, wet objects, animals, or every day shopping without having to worry about damage to the seat or particles that may fall down onto the carpet. In various aspects of the disclosure, high quality, durable, and waterproof material may be utilized for the liner. Such material may include neoprene/weight polyester with a waterproof backside, PVC free-non-toxic coatings, and rough finishes to help with friction. In various aspects of the disclosure, liner extensions may cover door interiors to avoid accidental window openings.

In various aspects, pockets and extra compartments may be added to the third portion and the fourth portion. In various aspects, automatic mechanisms or movement assist mechanisms may be added to automatically fold and/or unfold the cushion first part and the cushion second part. In various aspects, straps and buckles, as well as the plurality of panels, may attach extendable portions of the liner to headrests or other fastening points.

A variety of advantages may be derived from the use of the present disclosure. A vehicle seat may have double functionality to serve as a typical seat or a platform with a liner. The liner protects the vehicle interior from becoming dirty and keeps objects from falling off of the liner during sudden braking and erratic driving. The liner is easy to install and uninstall so that it can be removed for washing and replaced after it is clean. The liner may cover adjacent rear doors and thus prevent accidental opening of adjacent rear doors by pets that are being transported on the liner.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
   a seat coupled to a seatback, wherein the seat includes a cushion divided into a first part and a second part and wherein the first part and the second part are arranged to form a platform in an opened state; and
   a liner, wherein the liner is stored between first and second parts in an unopened state, and wherein the liner covers the platform in the opened state, wherein the liner includes an extendable member that selectively extends over the seatback, and wherein a hinge is disposed between a portion of the liner disposed over the second part of the cushion and the extendable member disposed over the seatback.

2. The vehicle seating assembly of claim 1, further comprising:
   a pivotable coupling that defines an axis wherein the first part and the second part are vertically aligned, a first edge of the first part and a first edge of the second part are attached to the pivotable coupling, and the first part is rotatable about the pivotable coupling so that the first part and the second part are horizontally aligned.

3. The vehicle seating assembly of claim 2, wherein the first part pivots approximately 180 degrees about the axis.

4. The vehicle seating assembly of claim 1, wherein the first part and the second part are vertically aligned in the unopened state, and wherein the first part and the second part are horizontally aligned in the opened state.

5. The vehicle seating assembly of claim 1, wherein the hinge defines an axis, and wherein the extendable member is rotatable about the axis from a substantially horizontal position to a substantially vertical position.

6. The vehicle seating assembly of claim 5, wherein the seatback comprises a seating surface and wherein the liner is selectively arranged over the seating surface at least when the seat is in the opened state.

7. The vehicle seating assembly of claim 6, further comprising:
an adjacent seatback positioned forward of the seat wherein the platform is disposed between the seatback and the adjacent seatback.

8. The vehicle seating assembly of claim 7, wherein the adjacent seatback includes a back surface and the liner includes a forward extending portion that is selectively arranged proximate the back surface.

9. The vehicle seating assembly of claim 8, wherein the liner includes a plurality of fasteners that secure the liner to the seatback and the adjacent seatback.

10. The vehicle seating assembly of claim 9, wherein the fasteners are loops that hang on a headrest of the seatback and a headrest of the adjacent seatback.

11. The vehicle seating assembly of claim 1, wherein the liner is removably attached to the platform.

12. A seating assembly, comprising:
a seat wherein the seat includes an upper portion and a lower portion, wherein a first edge of the upper portion and a first edge of the lower portion are coupled at a pivot and are operable between a seating position and a platform position when the upper portion is rotated about the pivot so that the lower portion and the upper portion are arranged adjacent to one another to form a substantially flat surface in the platform position;
a cover that is stored between the upper and lower portions of the seat in the seating position, wherein the cover includes a first portion and a second portion, wherein the first portion overlays a top surface of the upper portion in the platform position and the second portion overlays a top surface of the lower portion in a platform position; and
a seatback, wherein the seatback is coupled to the lower portion of the seat, wherein the cover includes a third portion that overlays the seatback, and wherein the third portion is continuous with the second portion.

13. The seating assembly of claim 12, further comprising:
a pivotable coupling between the third portion and the second portion, wherein the pivotable coupling includes a hinge disposed between the third portion and the second portion.

14. The seating assembly of claim 12, wherein the cover is detachable from the seat.

15. The seating assembly of claim 12, further comprising:
an adjacent seatback, wherein the cover includes an extendable fourth portion that overlays the adjacent seatback.

16. The seating assembly of claim 15, wherein the cover includes an extendable fifth portion that overlays an adjacent structure.

17. The seating assembly of claim 16, wherein the cover includes an extendable sixth portion that overlays an adjacent structure.

18. A seating assembly, comprising:
a seat, wherein the seat includes a plurality of panels and the plurality of panels are selectively arrangeable in a folded position or an unfolded position;
a cover stowed between the panels in the folded position, wherein the cover is selectively arrangeable to form a top surface of the plurality of panels in the unfolded position;
a seatback, wherein the seatback is coupled to the seat; and
an adjacent seatback, wherein the cover is selectively arrangeable over the seatback and the adjacent seatback.

19. The seating assembly of claim 18, wherein the plurality of panels include first and second panels, wherein the first panel includes a first cushion part, and wherein the second panel includes a second cushion part, and wherein the first cushion part is disposed over the second cushion part when the panels are in the folded position.

20. The seating assembly of claim 19, wherein the first cushion part is pivotably coupled to the second cushion part, and wherein the cover includes a hinge disposed between the portion of the cover disposed over the second cushion part and the portion of the cover disposed over the seatback.

* * * * *